(12) United States Patent
Sanguinetti (10) Patent No.: US 7,112,274 B1
(45) Date of Patent: *Sep. 26, 2006

(54) POST-PRODUCTION DRAIN INLET FILTER SYSTEM

(76) Inventor: Peter S. Sanguinetti, 903 Lucas Rd., Lodi, CA (US) 95242

( * ) Notice: Subject to any disclaimer, the term of this patent is extended or adjusted under 35 U.S.C. 154(b) by 10 days.

This patent is subject to a terminal disclaimer.

(21) Appl. No.: 10/705,058

(22) Filed: Nov. 10, 2003

Related U.S. Application Data (60) Provisional application No. 60/507,256, filed on Sep. 30, 2003.

(51) Int. Cl.
*E03F 5/06* (2006.01)

(52) U.S. Cl. .................. 210/163; 210/266; 210/474; 404/4

(58) Field of Classification Search ............. 210/163, 210/164, 266, 282, 314, 316, 335, 474, 477; 404/4, 5
See application file for complete search history.

(56) References Cited

U.S. PATENT DOCUMENTS

| | | | |
|---|---|---|---|
| 232,948 A | 10/1880 | Dernham | |
| 506,267 A | 10/1893 | Sefton | |
| 672,868 A | 4/1901 | Banwell | |
| 783,556 A | 2/1905 | Buskirk | |
| 979,182 A | 12/1910 | MacDonald | |
| 1,041,867 A | 10/1912 | Schodde | |
| 1,245,903 A | 11/1917 | Gross | |
| 1,686,415 A * | 10/1928 | Lyes | 210/164 |
| 2,615,526 A | 10/1952 | Lane | |
| 3,713,539 A * | 1/1973 | Thompson et al. | 210/164 |
| 4,419,232 A | 12/1983 | Arntyr et al. | |
| 4,594,157 A | 6/1986 | McGowan | |
| 5,032,264 A | 7/1991 | Geiger | |
| 5,372,714 A | 12/1994 | Logue, Jr. | |
| 5,397,464 A | 3/1995 | Hannon | |
| 5,405,539 A | 4/1995 | Schneider | |
| 5,486,287 A | 1/1996 | Murphy et al. | |
| 5,562,819 A | 10/1996 | Turner, Jr. et al. | |
| 5,575,925 A | 11/1996 | Logue, Jr. | |
| 5,632,888 A | 5/1997 | Chinn et al. | |
| 5,702,595 A | 12/1997 | Mossburg, Jr. | |
| 5,788,849 A | 8/1998 | Hutter, Jr. et al. | |
| 5,820,762 A | 10/1998 | Bamer et al. | |
| 5,849,198 A | 12/1998 | Sharpless | |
| 5,890,839 A | 4/1999 | Gunter | |
| 5,925,241 A | 7/1999 | Aldridge et al. | |
| 5,985,157 A | 11/1999 | Leckner et al. | |
| 6,015,489 A | 1/2000 | Allen et al. | |
| 6,017,166 A | 1/2000 | Mossburg, Jr. | |
| 6,080,307 A | 6/2000 | Morris et al. | |
| 6,086,758 A | 7/2000 | Schilling et al. | |
| 6,092,670 A | 7/2000 | Marriott | |
| 6,099,723 A | 8/2000 | Morris et al. | |
| 6,106,707 A | 8/2000 | Morris et al. | |
| 6,149,803 A | 11/2000 | Di Loreto et al. | |

(Continued)

*Primary Examiner*—Christopher Upton
(74) *Attorney, Agent, or Firm*—Stout, Uxa, Buyan & Mullins, LLP; Linda A. Fox; Frank J. Uxa (57) ABSTRACT

A filtration system is provided which generally includes a filter assembly and a connector assembly coupled to the filter assembly and structured to position the filter assembly in a drain, for example a storm drain. The connector assembly may include adjustable connectors in order to accommodate various flow conditions. The system may further include a diversion element designed to effectively direct an inflow of water into the filter assembly and a removable contaminant removal pillow.

6 Claims, 6 Drawing Sheets

U.S. PATENT DOCUMENTS

| | | |
|---|---|---|
| 6,178,565 B1 | 1/2001 | Franco |
| 6,200,484 B1 | 3/2001 | McInnis |
| 6,214,216 B1 | 4/2001 | Isaacson |
| 6,217,757 B1 | 4/2001 | Fleischmann |
| 6,231,758 B1 * | 5/2001 | Morris et al. ............... 210/163 |
| 6,261,444 B1 | 7/2001 | Forse |
| 6,270,662 B1 | 8/2001 | Gibson et al. |
| 6,270,663 B1 | 8/2001 | Happel |
| 6,274,036 B1 | 8/2001 | Ellis |
| 6,287,459 B1 | 9/2001 | Williamson |
| 6,294,095 B1 | 9/2001 | Lewis |
| 6,346,191 B1 | 2/2002 | Morris |
| 6,368,499 B1 * | 4/2002 | Sharpless .................... 210/164 |
| 6,517,709 B1 | 2/2003 | Cardwell et al. |
| 6,521,122 B1 | 2/2003 | Elliot et al. |
| 6,537,446 B1 | 3/2003 | Sanguinetti |
| 6,551,023 B1 | 4/2003 | Allard |
| 6,808,623 B1 | 10/2004 | Harris et al. |
| 2002/0130083 A1 * | 9/2002 | Middleton et al. .......... 210/163 |
| 2003/0136717 A1 | 7/2003 | Tseng |
| 2004/0094461 A1 | 5/2004 | Sharpless |

* cited by examiner

POST-PRODUCTION DRAIN INLET FILTER SYSTEM

This application claims the benefit of U.S. Provisional Application No. 60/507,256 filed Sep. 30, 2003, the disclosure of which is incorporated herein in its entirety by this specific reference.

The present invention generally relates to a storm drain filter system and more specifically relates to a post-production storm drain filter system for filtering water that passes into a storm drain.

Drainage systems collect and direct rainwater and runoff to underground storm sewers to prevent flooding of streets. In some geographic regions, this untreated water is drained directly into the ocean not far from public beaches. Until relatively recently, it was not well appreciated that even residential runoff water can be highly contaminated, and may pose serious threats to the environment and public health.

Typical storm drainage systems include drain inlets placed within parking lots, at margins of streets and roadways, and adjacent sidewalks. The drain inlet is commonly equipped with a removable iron grate element that is generally flush with the surrounding roadway and covers at least a portion of the inlet. In addition to providing a safety means, for example to prevent small children and animals from falling into the drain opening, the grate element is designed to prevent some of the relatively larger debris and trash items, such as tree branches, large paper or plastic containers, from entering the storm drain inlet. However, substantial volumes of relatively smaller trash items and debris, including lawn clippings, leaves, empty beverage containers, paper and plastic wrappers and the like, regularly pass into storm drains despite the use of iron grates. These items will eventually cause clogging of the drainage system if not periodically removed.

Assemblies have been developed for filtering a water flow entering such storm drain inlets. For example, it is known to place a filtering device such as a basket, screen or other porous element immediately below the storm drain grate to collect smaller items of debris that has passed through the grate.

It is known that storm drains equipped with conventional filter assemblies are at an increased risk of flooding, especially during high water flow events, such as during significant rainfall. Unfortunately, many filtering assemblies have been unable to meet certain best management practice standards, and are therefor prohibited.

Despite the many different filter systems and assemblies currently proposed and marketed, there is still a need for an improved filter system, for example, a system that is easy to maintain and will meet best management practice standards. The present invention satisfies this need and provides a highly effective, inexpensive storm drain filter system, particularly designed for use in post-production storm drains.

SUMMARY OF THE INVENTION

New systems for removing debris from water entering a drain, for example a storm drain, have been discovered. The systems of the present invention are straightforward to assemble, easy to use, inexpensive to manufacture and highly effective in filtering and removing material such as silt, particulate material and/or other debris, from water flowing through the drain. Importantly, the systems are designed to provide effective filtering while meeting best management practice standards.

A filter system of the present invention generally comprises a filter assembly configured to fit within a drain and structured to separate debris from water flowing into the drain, and a connector assembly, coupled to the filter assembly and structured to position the filter assembly at a selected location within the drain, for example at a selected depth below a surface or inlet of the drain. The systems may be customizable in that, in some embodiments, they can be adjusted, for example by an installer of the system, to accommodate expected flow conditions. The present systems are designed to substantially maintain a flow rate through the drain about equal to a flow rate through the drain without the system installed. In other words, the systems do not substantially interfere with or decrease the flow rate and do not cause or contribute to flooding of the drain.

In some embodiments of the invention, the system further comprises a diversion element for directing a flow of water into the filter assembly. The diversion element is positioned beneath a storm drain grate and includes an aperture having an inwardly sloped peripheral edge for directing flowing water and debris into the filter element.

In one particularly advantageous embodiment, the filter assembly comprises a hopper element sized to fit within a storm drain, for example a typical, post-production storm drain box. The hopper element comprises a substantially box-shaped structure including a substantially open top, a water permeable bottom surface, and non-porous sidewalls. The hopper element is sized and shaped to be positionable within the drain in a manner that allows spacing between the hopper and the interior structure of the drain.

The filter assembly preferably also comprises a removable filter element contained, for example suspended, within the hopper element and structured to trap debris contained in a water flow passing therethrough. For example, the filter element preferably comprises a porous portion and a frame portion. The porous portion is preferably made of a flexible mesh material having a flow rate capacity of at least about 145 gallons per minute per square foot, and a 40 Sieve (U.S.) porosity. The porous element is fastened to and depends from the frame element. The frame element is structured to be removably engagable to the open top of the hopper element.

The filter assembly may also comprise a contaminant removal element, for example a contaminant removal pillow sized to at least partially cover the water permeable bottom surface of the hopper element. The contaminant removal pillow comprises a mesh enclosure and one or more materials contained within the mesh enclosure. The materials are selected to be effective in removing one or more contaminants for example, metals such as copper, nickel and mercury, hydrocarbons, pesticides and/or other common pollutants, from water passing through the material.

Advantageously, the connector assembly is structured to position the filter assembly at a location sufficient to define a spacing between the filter assembly and surfaces of the drain. In some embodiments of the invention, the connector assembly is structured such that this spacing is easily adjustable in order that the system can be customized to meet a particular drain structure for example to accommodate a particular storm drain box depth, and/or particular drainage requirements, based for example, on a particular flood zone level, expectations of high precipitation, etc. The size of this spacing will generally be selected to provide sufficient open space to substantially prevent flooding of a storm drain when the system is in use.

The connector assembly may comprise a mounting bracket and connectors adapted to be connected to both the mounting bracket and the filter assembly. The connectors are, in some embodiments of the invention, length adjustable.

The mounting bracket is structured to be braced to a ledge of the storm drain, or alternatively, may be permanently mounted to sidewalls of the storm drain by means of bolts, screws, adhesives and/or the like. The mounting bracket preferably comprises first and second rods which are sized to fit across the storm drain inlet. The rods may be length adjustable. Preferably, the mounting bracket is structured to be positioned below, but not in contact with, a storm drain grate.

In one particular embodiment, the mounting bracket rods include depending support hooks for connecting the mounting bracket to the length adjustable connectors. The length adjustable connectors may comprise chain elements that are connectable to the support hooks. In one embodiment of the invention, the connectors comprise about four chain elements, removably secured to the mounting bracket support hooks.

More specifically, in this example, when the system is installed in the storm drain, distal portions of the chains are connected to the filter assembly, for example at the open end of the hopper element, and proximal portions of the chains are removably connected to the mounting bracket by means of the support hooks. The depth of the filter assembly may be easily adjusted by hooking the chains at specific links thereof in order to effectively determine the depth that the filter assembly will be suspended from the mounting bracket. This structure allows the filter assembly to be suspended at a desired depth below the storm drain inlet, wherein open spacing is provided between the filter assembly and the storm drain box. Other arrangements for defining an adjustable open spacing between the storm drain inlet and the filter assembly are considered to be within the scope of the invention.

When in use, the effective distance between the mounting bracket and the hopper element therefor defines a spacing that allows overflow to pass freely through the storm drain and prevent flooding thereof. It will be appreciated by those of skill in the art that during normal flow conditions, draining water will pass into the storm drain inlet and be directed through the filter assembly, where it will be filtered before entering the main sewer line. During abnormal flow conditions however, for example during high velocity/high volume flow that exceeds the capacity of the filter assembly, overflow will be drained through the spacing. In one embodiment of the invention, the connector assembly is structured to enable adjustment of the spacing. The spacing is selected by the installer of the system to provide optimal filtering and effective overflow drainage for a given condition.

In another aspect of the invention, the connector assembly is structured to be effective to support the filter assembly, suspended within the storm drain, independent of any storm drain grate or other form of support.

Preferably, the mounting bracket is structured to be capable of supporting the weight of the filter assembly and debris therein by engagement between the mounting bracket and the ledge projecting from the interior wall of the storm drain. Unlike prior art filter devices which rely upon the heavy grate of the storm drain as a means to secure and support the filter, the present invention is structured to be fully supportable by the engagement between the mounting bracket and a peripheral ledge in the storm drain. In addition, the connector assembly is effective in holding and supporting the filter assembly and a substantial volume of debris therein without any other form of support.

Once the system is installed within the storm drain, the system can fully support the weight of the filter assembly at full capacity, for example up to about 220 pounds of debris. Absence or removal of the iron grate of the storm drain does not weaken or otherwise effect the stability of the apparatus once the apparatus has been installed and filled with debris. Unlike prior art storm drain filters, the apparatus will not fall, collapse or become unstable upon removal of the iron grate.

In another advantageous embodiment of the present invention, a storm drain filter system is provided that generally comprises a hopper element having a substantially open top and a water permeable bottom surface and including rigid sidewalls having a flanged portion structured to be braced against a storm drain inlet opening, a filter assembly structured to be received within the hopper element and including a filter material for separating debris from water flowing through the storm drain, and a diversion element structured to direct a flow of water into the filter assembly. Preferably, the hopper element sidewalls define an overflow space sized to substantially inhibit flooding of the storm drain when the system is in use. Each of the sidewalls preferably comprises a sheet of material, for example of aluminum, or stainless steel.

Each and every feature described herein, and each and every combination of two or more of such features, is included within the scope of the present invention provided that the features included in such a combination are not mutually inconsistent.

These and other features, aspects and advantages of the present invention will become apparent hereinafter, particularly when considered in conjunction with the following claims, detailed description and drawings in which like parts bear like reference numerals.

BRIEF DESCRIPTION OF THE DRAWINGS

The present invention will be more clearly understood and the objects and advantages thereof better appreciated with reference to the following Detailed Description, when considered in conjunction with the following Drawings.

DETAILED DESCRIPTION OF THE INVENTION

Figure 1:
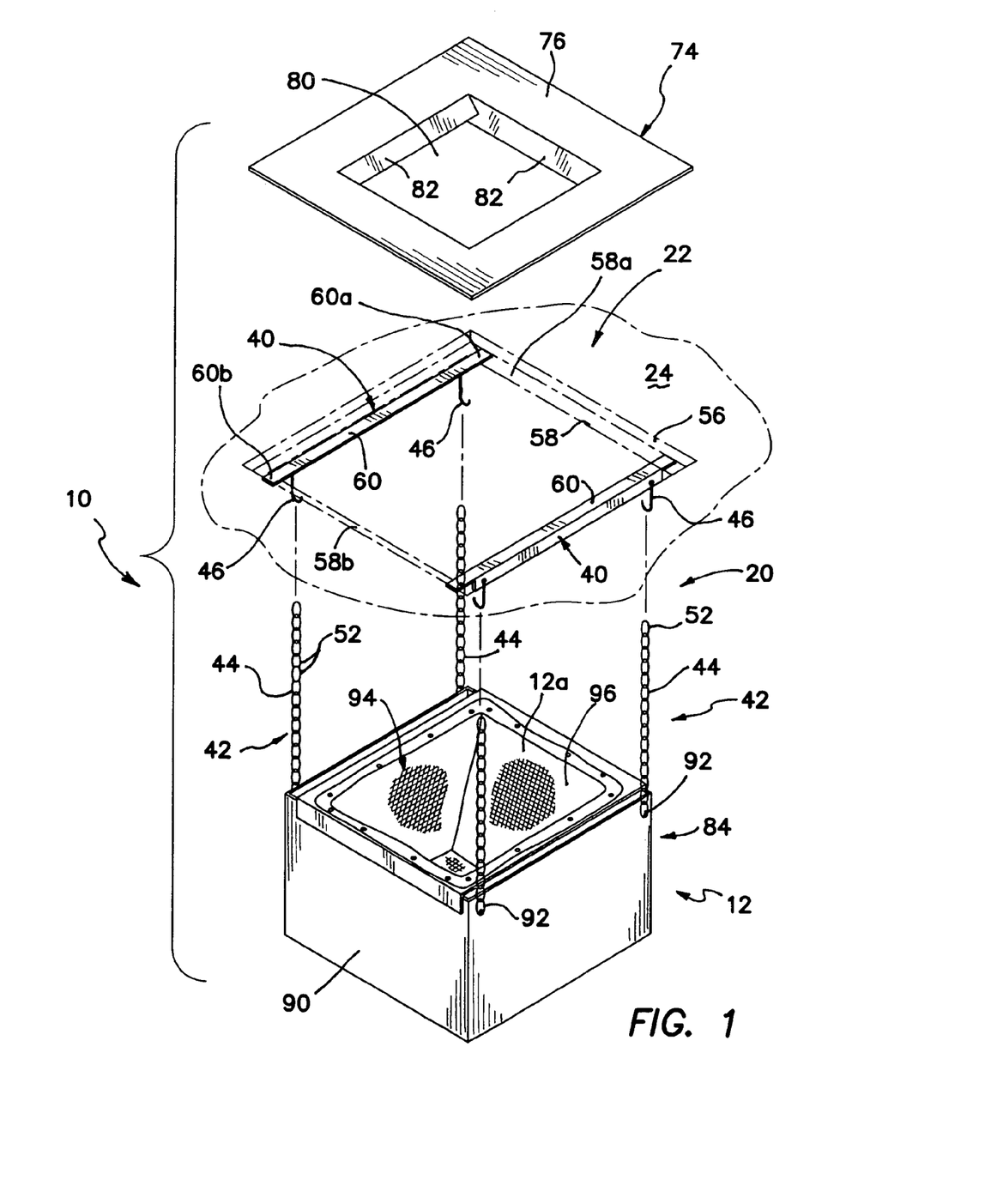
FIG. 1 shows an exploded perspective view of a filtration system in accordance with the present invention, including a filter assembly, a connector assembly and a diversion element.
Figure 2:
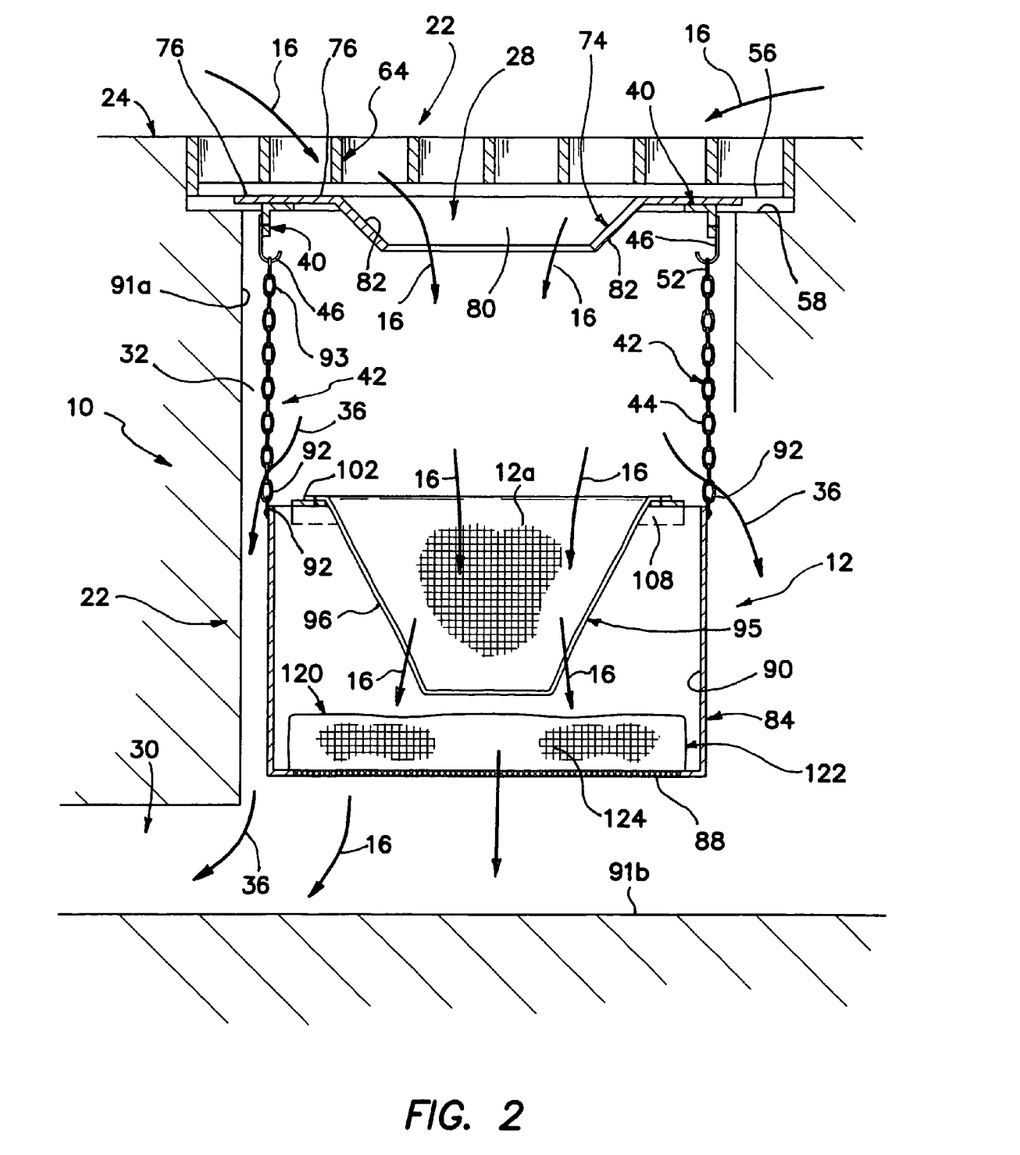
FIG. 2 shows a cross-sectional view of the system of FIG. 1 as installed within a post-production storm drain.

Turning now to FIGS. 1 and 2, a post-production filtration system in accordance with the present invention is shown generally at 10. The system 10 generally comprises a filter assembly 12 structured to separate debris (not shown) from water flowing therethrough (water flow direction under normal conditions represented by arrows 16 in FIG. 2). The system 10 may further comprise a connector assembly 20 coupled to the filter assembly 12. In this particular embodiment of the invention, the connector assembly 20 is structured to position the filter assembly 12 at a selected location within a drain, for example a storm drain 22 (not shown in FIG. 1), for example a post-production storm drain box located below a street or parking lot surface 24 and having drain inlet 28.

The connector assembly 20 may be structured to suspend the filter assembly 12 within the drain 22 at a position sufficient to allow overflow water and/or debris to bypass the filter assembly 12 thereby substantially reducing the chance of flooding of the drain 22.

More particularly, during certain flow conditions and/or events, for example during usually high velocity/high volume drainage and/or in the event that the filter assembly 12 has become an obstruction to effective drainage (e.g., the filter assembly has become clogged with debris) water/debris that has passed through the drain inlet 28 will at least partially bypass the filter assembly 12 by flowing through spacing 32, for example in a flow direction represented by arrows 36, shown in FIG. 2. The spacing 32 generally functions as an overflow outlet to allow flow of water around the filter assembly 12. In the embodiment of the invention shown in FIGS. 1, 2, and 3, the connector assembly 20 is structured to allow for selective adjustment of the spacing 32 to provide optimal filtering and effective overflow drainage for any given condition.

For example, the connector assembly 20 comprises a mounting bracket 40 and at least one connector 42, for example, a length adjustable connector. The connector 42 is structured to enable the filter assembly 12 to be suspended at a desired distance from the mounting bracket 40 such that the filter assembly 12 is located at a desired location, for example at a desired depth within the drain 22 and defines a desired spacing for accommodating overflow.

Turning now specifically to FIG. 1, the at least one connector 42 comprises, for example, about four connectors. For example, each connector 42 comprises a linked chain 44 that can be removably secured to the mounting bracket 40, for example by means of a support hook (for example ¾" cold shut) or like support element 46 that is structured to engage with a link 52 of the chain 44. Although linked chains 44 and support hooks 46 are shown in the Drawings, other suitable connection arrangements are possible and are considered to be within the scope of the present invention. For example, although not shown, it is contemplated that the connectors 42 may comprise rigid rods having multiple spaced apart eyelets for engaging pegs on the mounting bracket 40.

Preferably, the mounting bracket 40 is structured to be braced to walls or to other structure within the storm drain 22 without the use of bolts, clamps, adhesives or the like.

For example, FIG. 2 shows a cross sectional view of drain 22 which is somewhat typical of many post-production storm drains in that the drain 22 includes a peripheral projection or upper ledge 56 upon which a removable iron grate 64 is typically set. In addition, the typical post-production storm drain 22 commonly includes a lower ledge 58, located slightly deeper within the drain 22, below the upper ledge 56. The mounting bracket 40 of the present invention may be braced against the upper ledge 59 or the lower ledge 58 (as shown).

For example, turning back now to FIG. 1, the mounting bracket 40 may comprise a pair of support rails 60, each having a generally L-shaped cross section. More particularly, the support rails 60 are structured to bear against, or rest upon the lower ledges 58. Two of said support hooks 46 may be welded or otherwise secured to each support rail 60 as shown. The support rails 60 have dimensions of, for example, about 1" by about 1" by about ⅛".

In this particular embodiment of the invention, the filter assembly 12 is structured to be capable of being suspended from the ledges 58 by means of the connector assembly 20 without the storm drain grate 64 functioning to secure the system 10 in place. In other words, the system 10 is structured to be capable of being held in place using only the components of the system 10 itself and without bolts, clamps the storm drain grate or other mechanism for securing the connector assembly 20 to the storm drain.

Advantageously, the system 10 is structured to effectively hold and support up to about 220 pounds of debris or greater, even during high velocity flow conditions.

The support rails 60 are preferably made of steel or other suitable, rust resistant material. As shown most clearly in FIG. 1, each support rail 60 is sized to extend from one lower ledge (for example ledge 58*a*) to another lower ledge (for example ledge 58*b*) such that end portions 60*a* and 60*b* of support rail 60 bear against the ledges 58*a* and 58*b* as shown. End portions 60*a* and 60*b* are for example about 1" in length. It is contemplated that the support rail 60 may be structured to be size adjustable, for example using slidably interconnecting portions in order to accommodate different sizes of drain inlets.

Referring to FIGS. 1 and 2, the system 10 preferably further comprises a diversion element 74 structured to direct a flow of fluid into a mouth or inlet opening 12*a* of the filter assembly 12. The diversion element 74 includes peripheral flange portion 76 and aperture 80. The flange portion 76 is sized and structured to enable the diversion element 74 to be mounted or placed beneath the grate 64 of the storm drain 22, for example, against ledge 58. The diversion element 74 preferably includes depending inner peripheral portion 82, at least partially surrounding the aperture 80, which functions to direct or guide the flowing water into the filter assembly 12 and prevent bypass thereof. The depending portion 82 may slope inwardly, for example at an angle of about 45 degrees.

Figure 3:
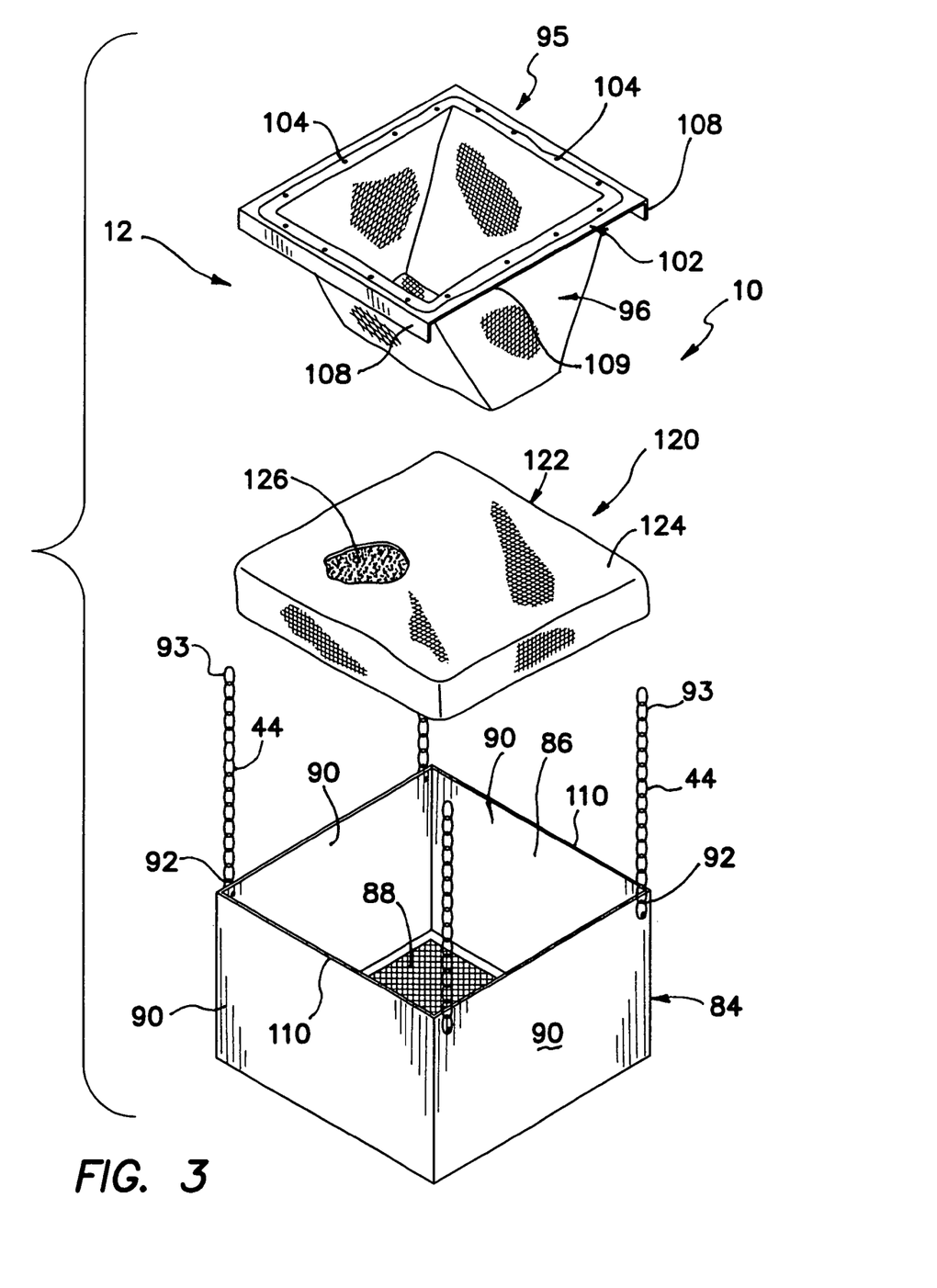
FIG. 3 shows another perspective view of the system shown in FIG. 1, without the diversion element, and including an optional contaminant removal pillow.

Referring now to FIGS. 2 and 3, the system 10 may comprise a hopper element 84, for example a rectangular, box-like element such as shown. Preferably, the hopper element 84 includes a substantially open top 86, a water permeable bottom surface 88, and substantially vertical non-permeable sidewalls 90. Bottom surface 88 comprises for example a wire mesh having from about 0.25" to about 0.5" pore size. The sidewalls 90 are preferably constructed of sheet metal, for example 24 gauge sheet metal or a suitable equivalent. The hopper element 84 is preferably sized and shaped to fit within the drain 22 without contacting any portion of the storm drain interior in order to allow overflow passage between the hopper element 84 and drain walls 91*a*. A distal portion 92 of each connector 42 may be secured to the hopper element 84 using a suitable connector mechanism, for example a bolt and Nyloc. Proximal portions 93 of the connectors 42 are engaged to the mounting bracket 40. When in use, the hopper element 84 is preferably suspended above a floor 91*b* of the drain 22 (see FIG. 2) in a level, suspended position within the drain 22.

The filter assembly 12 preferably also comprises a removable filter element 95, shown most clearly in FIG. 3. The filter element 95 is sized and structured to be contained within the hopper element 84, for example in a suspended fashion such as shown in FIG. 2. The filter element 95 is structured to separate and contain particulate material and other debris from water flowing through the filter element 95.

Still referring to FIG. 3, the filter element 95 comprises, for example, a porous portion 96, for example comprising a flexible mesh material, for example a nylon mesh, having a suitable sieve porosity for the desired application. Preferably, for some applications of the system 10, the porous portion 96 is comprised of a commercially or otherwise available geotextile filter material. Preferably, the flow rate capacity of the porous portion is at least about 145 gallons per minute per square foot. For example, the mesh material may have a 40 Sieve (U.S.) porosity. This porosity allows the filter element 95 to capture relatively fine particulate material present in runoff water, while allowing a substantially steady and consistent draining of the flow into the storm drain 22.

The porous portion 96 may all be cut from a single piece of material. Alternatively, separate panels of mesh material may be sewn or otherwise secured together to form a bag-like structure.

The removable filter element 95 preferably includes a substantially rigid frame 102 fastened, for example by rivets 104, or other suitable connectors, to the mesh portion 96. The rigid frame 102 may be comprised of any suitable material, for example aluminum or the like. The frame 102 preferably includes depending portions 108 which form, for example, a 1" vertical drop of the frame structure. The depending portion 108 is preferably formed along only two or three sides of the frame 102 as shown, leaving at least one side 109 without a vertical drop, and thereby allowing the filter element 84 to be manually slipped onto the hopper element 84 and "locked" thereto, for example, along a rim 110 of the hopper element 84.

FIGS. 2 and 3 show another advantageous optional feature of the system 10 of the present invention, specifically a contaminant removal element 120. The contaminant removal element 120 comprises for example, one or more contaminant removal pillows 122, sized to at least partially cover the water permeable bottom surface 88 of the hopper element 84. Each pillow 122 includes for example, a mesh enclosure 124 and a contaminant absorbent filling 126, for example a melt-blown polypropylene oil-absorbent.

In one embodiment of the invention, the pillow 122 comprises multiple materials, for example, multiple layers of different materials, wherein each layer is structured for removing/destroying specific chemical contaminants that pass therethrough. The material may be suitable for removing copper, nickel, mercury etc.

Figure 3A:
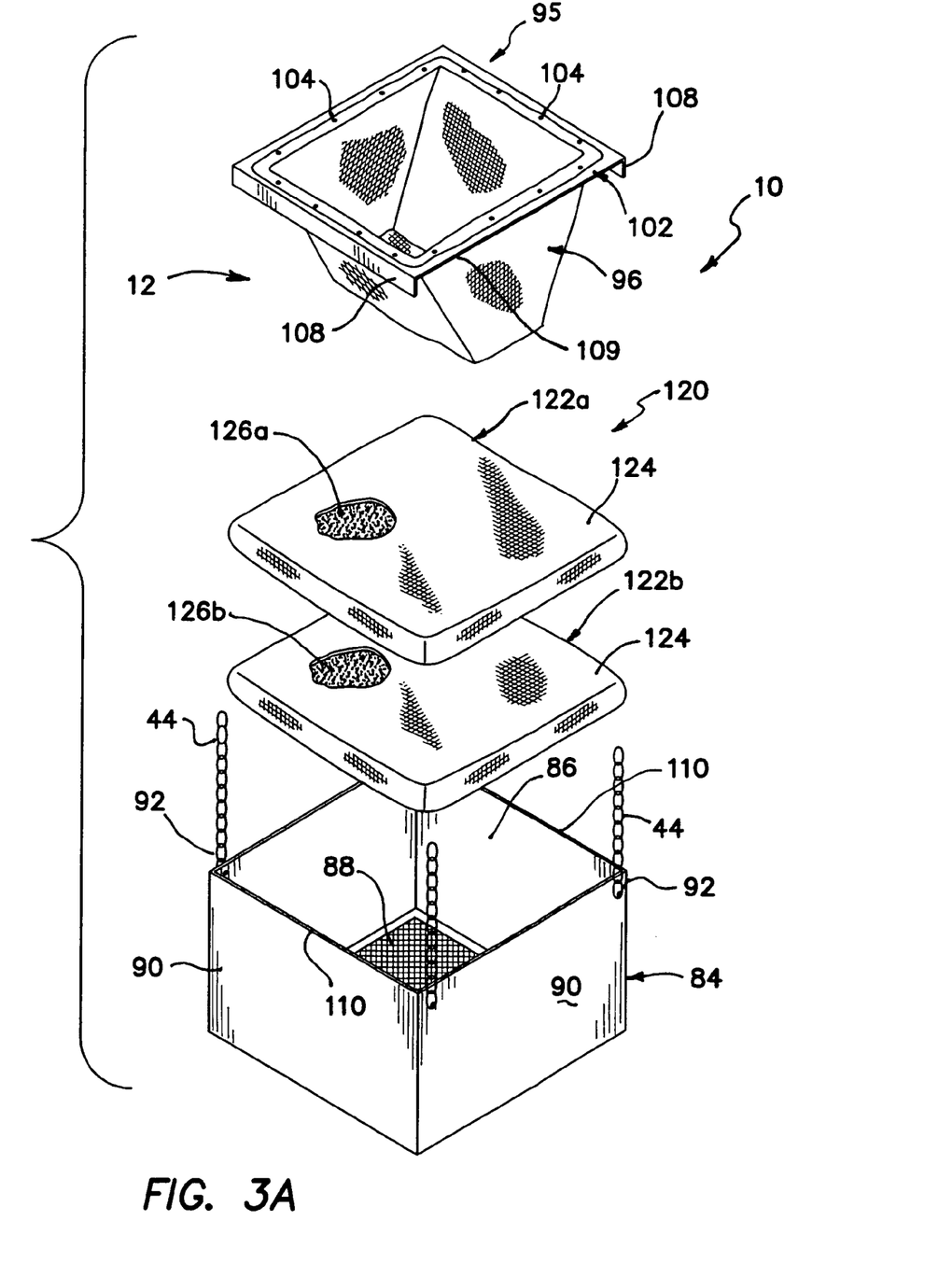
FIG. 3a shows the same view as FIG. 3, including multiple contaminant removal pillows.

Alternatively, as shown in FIG. 3a, the contaminant removal element 120 comprises multiple, separate pillows 122a and 122b, wherein each pillow 122a, 122b includes a material 126a and 126b, suitable for removing a particular pollutant. Thus, the system 10 may be customized for a particular application by selection of one or more different contaminant removal pillows 122a, 122b to be placed in the hopper element 84.

Figure 4:
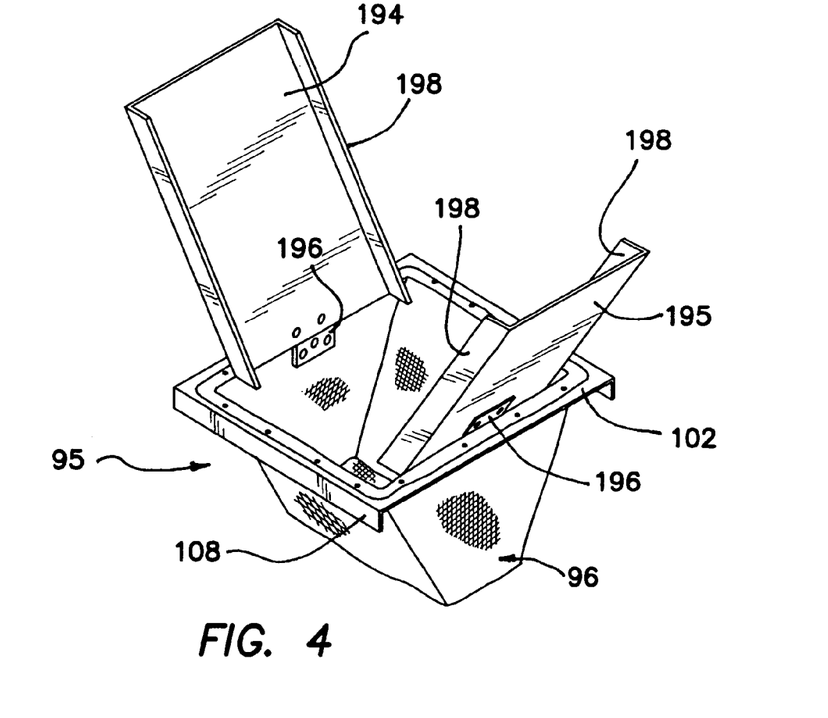
FIG. 4 shows a perspective view of an optional feature of the filter assembly component of the system.

FIG. 4 shows another optional feature of the invention. Particularly, the removable filter element 95 may include panels 194 made for example of aluminum or other suitable material and connected for example by hinges 196 to the filter element 95 as shown. The panels 194 may include angular edges 198. In use, the panels 194 slope inwardly to provide additional flow guidance from the drain inlet (not shown) into the filter element 95.

Figure 5:
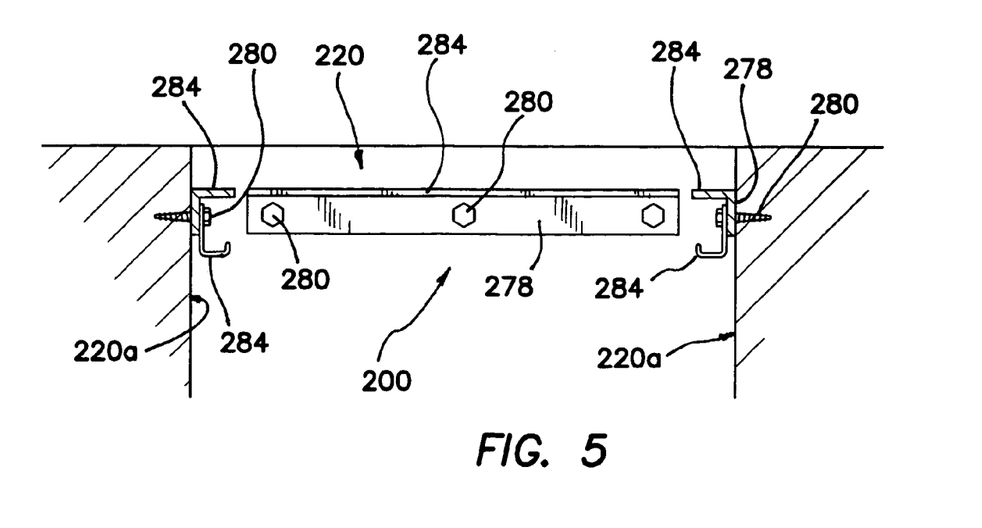
FIG. 5 shows a cross-sectional view of an alternative connector assembly component of the present invention.

Turning now to FIG. 5, in some circumstances, a suitable projection or ledge is not available or not suitable for holding mounting bracket 40 shown in FIGS. 1 and 2. Thus, it is sometimes desirable to bolt or otherwise secure a modified connector assembly 200 directly to an inner surface 220a of the drain 220 rather than using removable mounting brackets 40. For example, the modified connector assembly 200, includes mounting rails 278, for example four mounting rails including hooks 246, and structured to be secured, for example by bolts 280, to the inner walls 220 of the storm drain 220. The mounting rails 278 preferably include substantially horizontal flanges 284 in order to form a peripheral ledge suitable for supporting diversion element 74 (shown in FIG. 1).

Alternatively, support hooks 46 may be directly bolted to a suitable surface within the storm drain 22.

Figure 6:
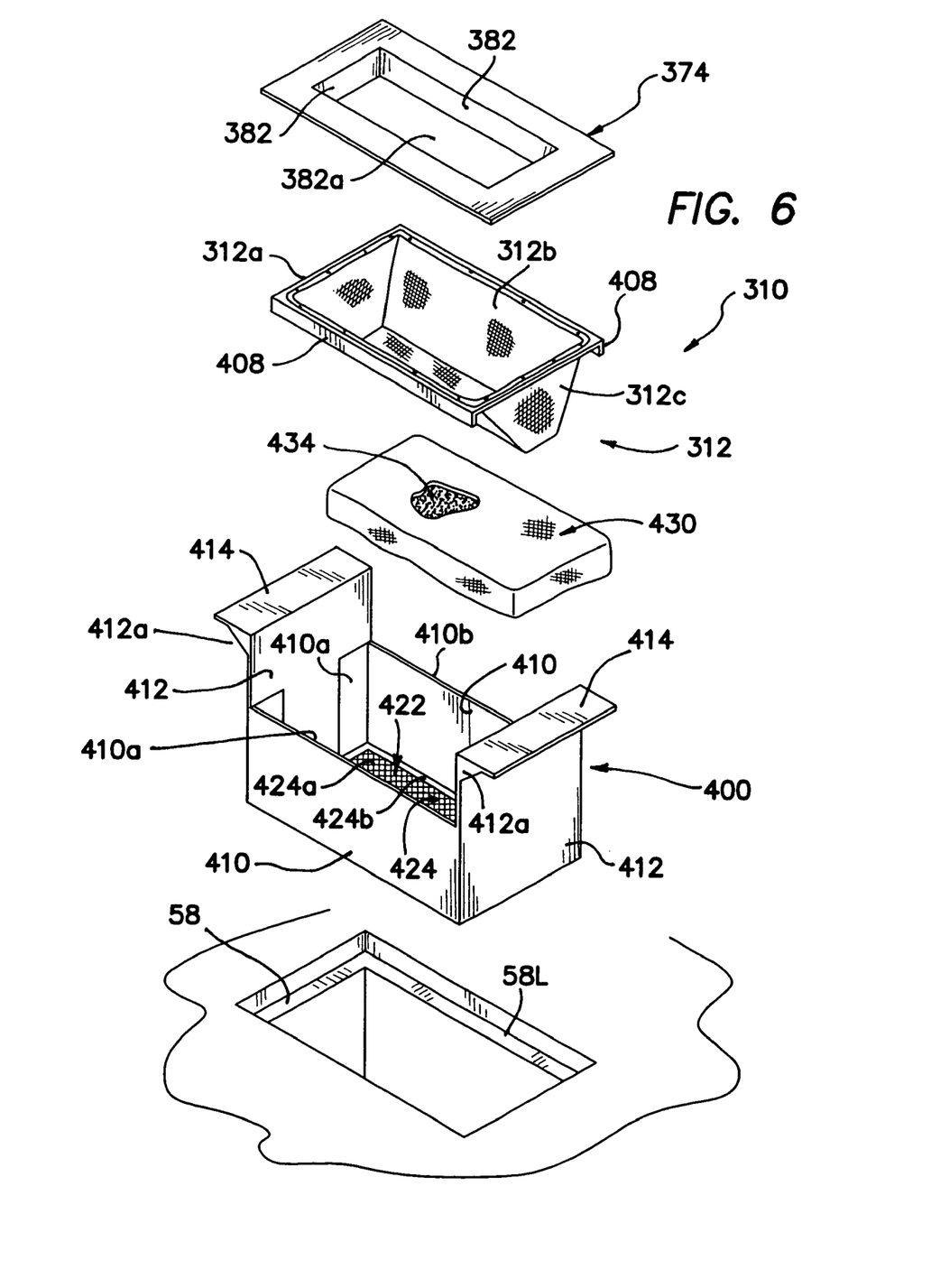
FIG. 6 shows a perspective view of a preferred embodiment of the present invention.

Turning now to FIG. 6, another embodiment of the present invention is shown generally at 310. Except as expressly described herein, system 310 is similar to system 10.

The system 310, in accordance with this embodiment of the invention, generally comprises a filter assembly 312, a diversion element 374 and a hopper assembly 400.

The filter assembly 312 may be similar to filter element 95 described elsewhere herein, and preferably includes an aluminum frame 312a defining an inlet opening 312b, and a porous portion 312c secured to the frame 312a preferably comprising a porous, geotextile filter material. As shown, the frame 312a may include depending rim portions 408.

A major difference between system 10 and system 310 relates to the hopper assembly 400, which replaces both the hopper element 84 and connector assembly 20 of the system shown in FIG. 3. Hopper assembly 400 comprises sidewalls 410 and end pieces 412. The sidewalls 410 and end pieces 412 are preferably structured of about 14 to about 24 gauge stainless steel or a suitable plastic material. Each of the sidewalls 410 may include an assembly flange 410a structured to be secured, for example by bolting, welding or the like, to each of the end pieces 412.

For purposes of example, the sidewalls 410 have a height of about 6 inches and a length that is suitable for a particular application, for example, a particular storm drain size.

Each of end pieces 412 preferably includes a flanged portion 414 that is sized and structured to rest upon drain inlet ledge 58.

Advantageously, hopper assembly 400 is provided in a size at least slightly smaller than the storm drain inlet of interest. Prior to installation of the system, flanged portions 414 are provided with an excess length that can be cut or reduced in size in order to custom fit the system 310 to the storm drain of interest. The flanged portions 414 are preferably made of stainless steel, more preferably stainless steel having a gauge of between about 14 gauge and about 24 gauge, or more. A metal support piece 412a may be provided as shown.

Sidewalls 410 are relatively shorter in height than end pieces 412, thereby forming side openings, or overflow space, defined between end pieces 412 and sidewalls 410 in order to accommodate passage of overflow as may be necessary during a storm event, for example. Overflow space is sized to substantially inhibit flooding of the storm drain when the system 310 is in use. For example, end pieces 412 may have a height of about 10 inches, defining, therefor, a gap of about 4 inches deep with the sidewalls 410.

Sidewalls 410 and end pieces 412 may be comprised of panels of aluminum, stainless steel, plastic or other suitable, preferably rust-resistant, material.

Hopper assembly 400 further includes a permeable bottom surface 422, for example, comprising a screen element 424, more preferably comprising a plastic mesh material 424*a* on a welded aluminum frame 424*b*. A removable, replaceable contaminant pillow 430 may also be provided, for example sized to substantially entirely cover the permeable bottom surface 422 of the hopper assembly 300. Contaminant pillow 422 may be structured of materials similar to contaminant pillow 120 shown in FIG. 3, and performs a similar function thereto. In one embodiment of the invention, the pillow 430 comprises a high density polyethylene material having a sieve rating of about 5. The pillow 430 may comprise a meltblown polyethylene hydrocarbon capturing filler 434.

Preferably, when the system 310 is fully assembled and in use in a post-production storm drain, the rim portions 408 of filter assembly 312 overlap and rest upon ledge 410*b* of hopper sidewalls 410. Hopper flanged portions 414 are braced against drain opening ledge 58, such that the system 310 is securely suspended beneath drain inlet opening. Diversion element 374 is positioned above hopper 400, for example, resting or positioned against drain lateral ledge 58L and hopper flanges 414. Inner peripheral portions 382, for example, inwardly sloped inner peripheral portions, of diversion element 374 define opening 382*a*, for example, generally central opening, which is preferably sized to be suitable for a desired application. Peripheral portions 382 are structured to direct water and debris entering drain inlet into the filter assembly 312, thereby substantially preventing bypass of the filter assembly 312. Preferably, the opening 382*a* is sized and structured, consistent with a size of the filter element opening, to effectively direct a flow of water toward a center of the filter element. More preferably, the opening 382*a* is somewhat smaller than the opening of the filter element, for example about 1 inch shorter in width and about one inch shorter in length than a width and length, respectively, of the filter element opening 312*b*.

Any and all features described herein and combinations of such features are included within the scope of the present invention provided that the features of any such combination are not mutually inconsistent.

While this invention has been described with respect to various specific examples and embodiments, it is to be understood that the invention is not limited thereto and that it can be variously practiced within the scope of the following claims.

What is claimed is:

1. A storm drain filter system comprising:
    a hopper element having a substantially open top and a water permeable bottom surface and including end pieces each having a portion structured to be positioned against a ledge of a storm drain inlet and lateral sidewalls disposed between the end pieces;
    a filter assembly structured to be received within the hopper element, the filter assembly including a first frame element structured to engage the lateral sidewalls of the hopper element, and a container having porous sidewalls and a bottom spaced apart from the first frame element for separating and holding debris from water flowing through the storm drain; and
    a diversion element having an inlet sized and structured to direct a flow of water into the filter assembly.

2. The system of claim 1 wherein the lateral sidewalls define an overflow space sized to substantially inhibit flooding of the storm drain when the system is in use.

3. The system of claim 2 wherein the diversion element includes inner peripheral portion defining an opening, the inner peripheral portion being sized and structured to direct a flow of water into the filter element and substantially prevent bypass thereof.

4. The system of claim 1 wherein the filter assembly further comprises a contaminant removal element sized to substantially entirely cover the water permeable bottom surface of the hopper element.

5. The system of claim 4 wherein the contaminant removal element comprises a removable contaminant removal pillow.

6. The system of claim 5 wherein the contaminant removal pillow comprises a meltblown polypropylene material.

* * * * *